United States Patent Office 3,597,395
Patented Aug. 3, 1971

3,597,395
MOLECULAR COMPLEXES OF POLYMERIC CYCLIC CARBAMATES WITH SULFATES, SULFONATES AND SULFONAMIDES
Wilhelm E. Walles, Midland, Mich., assignor to The Dow Chemical Company, Midland, Mich.
No Drawing. Application Aug. 19, 1966, Ser. No. 573,488, which is a continuation-in-part of application Ser. No. 12,254, Mar. 2, 1960. Divided and this application Feb. 4, 1969, Ser. No. 796,594
Int. Cl. C08f 7/12
U.S. Cl. 260—47                           1 Claim

ABSTRACT OF THE DISCLOSURE

Complex obtained by mixing a polyvinyl lactam with an organic sulfur compound, characteristically a sulfate, sulfonate, or sulfonamide.

RELATIONSHIP TO OTHER CASES

The present specification and claims constitute a divisional application out of Ser. No. 573,488 filed Aug. 19, 1966, and now U.S. Patent 3,449,339 which in turn was a continuation-in-part of Ser. No. 12,254, filed Mar. 2, 1960 and now abandoned.

The present invention is the sole invention of Wilhelm E. Walles of 3606 Chestnut Hill Drive, Midland, Mich., and is concerned with novel compositions of matter and is particularly directed to novel resonance complexes comprising cyclic carbamates.

According to the present invention I have invented certain novel complexes possessing remarkable stability. All the present complexes have, in common, the property that each of them comprises, as one member of the complex, a cyclic carbamate compound, and as the other member another organic compound comprising at least a cation, that is to say, an electropositive moiety, and a negative organic radical.

The known noun *complex* is used herein in strict accord with one of its known meanings, to designate, in a generic or specific sense, a composition of matter such as those of the present invention; a substance composed of separate molecules bonded together by forces not so strong as conventional covalent bonds but stronger than hydrogen bonding, and strong enough that not only are the present complexes stable under ordinary conditions of preparation, storage, and employment, but also they confer stability on the behaviour of their members.

The bonding of the present complexes arises when candidate substances to become members of the complex are brought into contact one with another, and occurs without addition to or subtraction from any compound of any atom.

The noun *complectant* is used generically to designate a molecular chemical substance which may be caused to unite with a compound comprising a cationic, that is to say, an electropositive moiety and a negative organic group in preparation of the present complexes. The complectant is, in general, the material whose properties have been observed to have the greater effect (of the effects of at least two kinds of components of the resulting complex) upon the solubility, stability, physical state, and many other physical properties of said complex, and is common to many different kinds of complex. All the present complectants are cyclic carbamate compounds.

The noun *complectate* is used in the present specification and claims to designate an organic chemical substance other than the complectant, a molecule of which comprises at least a cation, that is to say a positive moiety, and a negative group, which unites with the complectant in the preparation of the present complexes; the complectate is the material whose properties have frequently been observed to have the greater effect (of the effects of the two kinds of members of the resulting complex) upon many chemical and particularly biochemical properties of the complex. The properties of complectates are dependably stabilized. Volatility, if any, is suppressed. Toxicity is reduced. Routine chemical reactivity is not affected.

In view of these definitions, the present invention relates to novel complexes of which the complectants are cyclic carbamate compounds of which oxazolidinone and oxazinidinone are representative, and designated by the formula

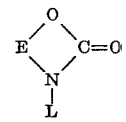

wherein O is the symbol for oxygen, C is the symbol for carbon, N is the symbol for nitrogen, the foregoing being conventional symbols, and wherein E represents a divalent group which, in every occurrence, introduces either two or three carbon atoms at the indicated heterocyclic ring site between nitrogen and oxygen, and may be ethylene (dimethylene), trimethylene, methylethylene (isopropylene), 1,2-dimethylethylene (2,3-n-butylene), 1,3-amylene, 2,3-amylene, 2,4-amylene, 1,2-hexylene, 2,4-hexylene, 2,3-hexylene, 3,4-hexylene; cyclohexyl ethylene, phenylethylene, 1-phenyl-1,3-propylene, 1-phenyl-1,2-propylene, (p-tolyl)ethylene, 2-(o-tolyl)-1,3-trimethylene.

By known addition polymerization of vinyl, allyl, or isopropenyl, L can become a group

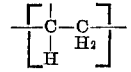

or

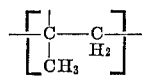

or

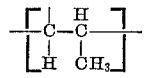

and the resulting compounds are polymers upon each second carbon of which recurs a group

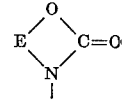

The polymers are typically of K-values according to Fikentscher of from about 2 to about 200.

The complectates are organic compounds containing hydrogen attached to a negative, that is to say, an anionic organic group. The negative or anionic organic groups are those generally recognized by chemists, for example as defined in Hackh's Chemical Dictionary by Grant (McGraw-Hill Book Company, New York, 3rd edition, 1944) page 565, see "negative group," second meaning. Within the scope of the definition, the negative groups to be employed are those which exclude inorganic group.

More particularly, a complectate to be employed in the present invention is a compound of the formula $$Q_n\text{---}G\text{---}R$$

In this general formula, Q represents hydrogen or, by dissociation as in water, an electron remaining with the dissociated ion, as when the proton of hydrogen exists temporarily in isolation.

Further, in this formula, $n$ represents the valency of G with respect to Q.

G represents one of the moieties

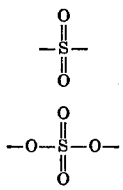

Also, in the present specification and claims, when X has the values hereinafter stated, R is selected from

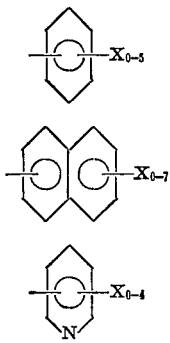

wherein X is selected from

—OH
—Cl, —Br, —I

loweralkyl

In certain of the present complectates, the compound is best understood when G and R are taken together. In such compounds, these two moieties taken together can represent

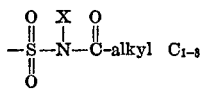

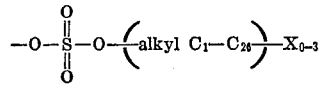

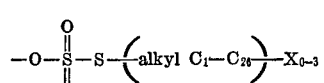

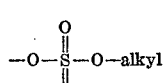

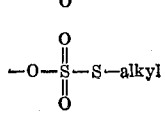

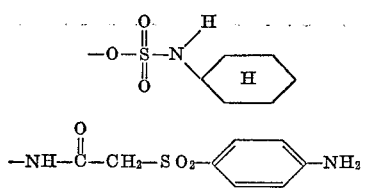

No byproduct is formed as a result of preparation of the instant complexes. By the employment of stoichiometric amounts of pure starting materials it is possible to prepare the present complexes in pure form. If the complectant be employed in excess, a resulting pure but unsatisfied complex will be prepared. If complectate be employed in excess, a resulting complex impure by reason of surplus complectate will be prepared. In the latter instance, employment of further complectant wherewith to prepare further complex binds the excess complectate, obviating need for other means of purification.

The utilities of the present complexes are, in general, control of solubility and dispersibility of bound substances in a variety of solvents and non-solvent media, making possible exhibition of desirable properties deriving from the complectate but not otherwise available; in a wide range of applications the complexes exhibit useful biological properties deriving from the complectates but greatly attenuated undesired toxic properties of the complectates. Many of the complexes exhibit the useful properties but almost none of the vapor pressure of vapor-producing complectates. The complexes have wide application in chemical purification, extraction, and synthesis. Complexes of good stability are prepared comprising complectates which are chemically unstable; but such complexes usually exhibit desired properties such as biological activities of the complectate. Other useful properties are apparent in the following portions of the present specification.

The complectant materials to be employed according to the present invention, including many of the non-polymeric materials, are readily prepared according to the following reaction.

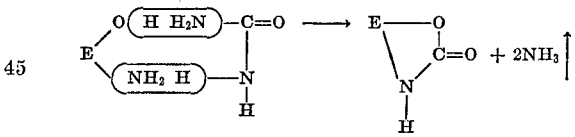

wherein E has the values hereinbefore set forth. By the choice of appropriate starting materials, a choice which, in view of the present teaching, lies readily within the skill of chemists, it is possible to prepare oxazolidinones and substituted oxazolidinones of an extremely wide range.

When it is desired to prepare a cyclic carbamate material the structure of which can be accurately predicted from the identity of the starting materials, the aminoalkanol material to be reacted with urea should, preferably, contain only one hydroxyl group; when only one such hydroxyl group is present the reaction follows the course indicated in the foregoing general reaction. When however, there is employed an amino alkanol material containing more than one hydroxyl group, ring closure and resulting formation of a cycliccarbamate may occur between the urea moiety and the amino alkanol moiety involving one, or, as the case mayh be, the other hydroxyl site. Thus, various reaction products of uncertain identity may be prepared. However, the reactions of two aminodiols have been studied, and they may be employed with confidence. The oxazolidinone not bearing a substituent upon the ring nitrogen atom may be reacted with an alkenyl alkyl either in dimethyl formamide solvent and in the presence of mercuric acetate catalyst in a known trans-alkenylation reaction whereby to introduce, as substituent upon the ring nitrogen of oxazolidinone, or oxazinadinone, an alkenyl substituent.

The alkenyl-substituted heterocyclic complectant materials may, if desired, be polymerized. Such polymerization is readily effected in known procedures, for example by heating the desired monomer or mixture of monomers in a reaction medium such as water, in the presence of a small amount, for example 0.5 weight percent, of a polymerization catalyst such as benzoyl peroxide or $\alpha,\alpha'$-azobis(isobutyronitrile), at a temperature in the range of from 50° to 100° C. When it is desired to obtain the high molecular weight polymers, the polymerization is carried out at a temperature in the lower portion of the polymerization temperature range and with a relatively smaller amount, for example, 0.01 to 0.1 weight percent of catalyst. When it is desired to obtain the various low molecular weight polymers of the present invention, representing a very small number of monomeric moieties, the polymerization is carried out at a temperature in the upper portion of the polymerization temperature range, such as 80°–90° C., and in the presence of a relatively larger amount, for example 2 to 3 weight percent of catalyst. Upon completion of the polymerization, the components of the resulting mixture may if desired be separated according to molecular weight in known manners, such as fractional distillation, centrifugation, and the like.

The present polymers and copolymers, in general, show little or no tendency to be injured by exposure to, for example, sunlight, air, and heat and other influences within a moderate temperature range near to living conditions of animal and vegetable organisms.

The present complectants and, correspondingly, the present complexes may readily be formed into desired shapes and sizes. Such forming is, in general, readily effected by the simple means of subjecting the complectants or complex in granular or pulverulent form to a formative pressure in such known procedures as tableting and the like.

Many organic compounds which may be considered as sulfur-containing acids and their ions, including aromatic, aliphatic, araliphatic, and heterocyclic sulfate, sulfonate, sulfinate, and similar acids and their ions combine with complectants of the sort described to from complexes of the present invention. The complexes are, in general, chemically stable under ordinary conditions and over a substantial nearby range of temperatures, pressure, and other environmental factors.

A representative sulfur compound complectate is benzene sulfonic acid or its ion. However, other aromatic, araliphatic, aliphatic, and heterocyclic sulfonic or sulfuric acids, manthic acids and substituted xanthic acids or their ions and sulfinic acids, and for each, the ion also, and the like, are employed with good results.

Illustrative of some of the sulfur-containing acidic compounds which may be employed in the preparation of complexes according to the present invention are:

methyl hydrogen sulfate,
ethyl hydrogen sulfate,
S-monoethyl thiosulfate,
propyl hydrogen sulfate,
S-monopropyl thiosulfate,
isopropyl hydrogen sulfate,
1-ethylisopropyl hydrogen sulfate,
S-monoisopropyl hydrogen thiosulfate,
mono-n-butyl sulfate,
mono-sec-butyl sulfate,
monoisobutyl sulfate,
mono-n-amyl sulfate,
mono-iso-amyl sulfate,
S-monoisoamyl thiosulfate,
mono-2-ethylbutyl sulfate,
mono-n-octyl sulfate,
monoethyl sulfate,
monoceryl sulfate,
monoallyl sulfate,
S-monoallyl thiosulfate,
mono (1-allyl)-isobutyl sulfate,
mono (1-allyl)-isoamyl sulfate,
phenyl sulfate,
p-acetylphenyl sulfate,
p-nitrophenyl sulfate,
3-methylphenyl sulfate,
2-amino-3-carboxyphenyl sulfate,
2-amino-5-carboxyphenyl sulfate,
2-amino-4-methylphenyl sulfate,
2-amino-4-chlorophenyl sulfate,
6-amino-3-methylphenyl sulfate,
2-amino-1-naphthylphenyl sulfate,
2'-methyl-4-dimethylamino-trans-stilbene-3 sulfate,
4-dimethylaminoazobenzene-3-sulfate,
dodecyl hydrogen sulfate,
hexadecyl hydrogen sulfate,
octadecyl hydrogen sulfate,
methylsulfonylacetic acid,
methanesulfonic acid,
ethanesulfonic acid,
benzenesulfonic acid,
toluenesulfonic acid,
benzenedisulfonic acid,
1,2-xylene-4-sulfonic acid,
1,3-xylene-4-sulfonic acid, 1,3-xylene-2-sulfonic acid,
1,4-xylene-2-sulfonic acid,
1,3-xylene-2-sulfonic acid,
1,2,4-pseudocumene-5-sulfonic acid,
mesitylene sulfonic acid,
cymene sulfonic acid,
1,3,5-benzene trisulfonic acid,
toluenedisulfonic acid,
mesitylene disulfonic acid,
o-chlorobenzene sulfonic acid,
m-chlorobenzene sulfonic acid,
p-chlorobenzene sulfonic acid,
o-bromobenzene sulfonic acid,
m-bromobenzene sulfonic acid,
p-bromobenze sulfonic acid,
m-iodobenzene sulfonic acid,
p-iodobenzene sulfonic acid,
o-nitrobenzene sulfonic acid,
m-nitrobenzene sulfonic acid,
p-nitrobenzene sulfonic acid,
m-nitrosobenzene sulfonic acid,
p-sulfanilic acid,
1-aniline-2,4-disulfonic acid,
4'-phenylamino azobenzene-4-sulfonic acid,
benzene thiosulfonic acid and the like, and the ions as formed by their dissociation in water.

The complexes tend to form quickly and the resulting products are typically somewhat more stable than the complexes of some of the other subgeneric types herein. Some correlation may exist between, on the one hand, the acidity of sulfur-containing organic acid which may be regarded as complectate or parent substances of complectate ions, and on the other hand, the stability of the resulting complex.

Illustrative of complexes of the instant subgeneric group of the present invention are the products of the following examples, which are not to be construed as limiting.

Example 1

Complex of polymeric 5-methyl-3-vinyloxazolidin-2-one and monomethyl sulfate.—In the present example, the complectant is polymeric 5-methyl-3- vinyloxazolidin-2-one characterized by having a K-value according to Fikentscher of approximately 30. The complectant is water soluble. A 1 percent solution heated to temperatures of about 39° C. and somewhat higher, becomes cloudy, indicating a change of solubility probably ascribable to a thermally induced change in geoisometric form. At yet higher temperatures such as 80° C., the solution again becomes clear.

The complectate in the present example is the monomethyl ester of sulfuric acid. The complectate is an oily liquid at ordinary temperatures, which, when heated, decomposes before boiling. It is readily soluble in water.

In carrying out the preparation, 100 milliliters 1 percent aqueous solution of the complectant is gently warmed. At approximately 35° C., turbidity begins to be apparent, and by 39° C., the upper limit temperature in the preparation of the present example, the solution is distinctly cloudy. To the said solution is added 100 milliliters 1 weight percent aqueous solution of the complectate. A water-soluble complex forms immediately, as is evidenced by disappearance of the cloudiness of the complectant alone. The pH of the resulting complex mixture indicates the presence of the acid in an unreacted form, indicating that complecting in the present example does not involve a chemical reaction of the acidic moiety of the complex.

Example 2

A complex is prepared of which the complectant is polymeric 5-methyl-3-vinyloxazolidin-2-one and the complectate is benzenesulfonic acid. In carrying out the preparation, a 1 weight percent solution of complectant in water is prepared and heated to a temperature of 40°, at which the solution is cloudy. To the cloudy solution is added approximately 1 weight percent benzenesulfonic acid. A complex promptly forms and the solution becomes clear. In the said complex, each benzenesulfonic acid molecule bonds, without conventional chemical reaction, with one of the cyclic carbamate moieties of the complectant. The complex is acidic, and, when isolated, is a solid which, in mass, is glassy and in finely divided form is white; it is readily soluble in water.

From the foregoing general definitions of the complectates to be employed in the instant aspect of the present invention, it will be apparent also that a great many sulfonamides including all benzene sulfonamides and sulfonanilides of which the sulfonamide nitrogen atom carries a hydrogen, come within the present definition and form complexes of the sort described. The ability of such compounds to enter into the instant complexes derives from the sulfonamide moiety, on the aromatic nucleus. Representative complectates include benzene sulfonamide, and benzene sulfonanilide. Other examples of compounds to be employed as complectates in the instant aspect of the present invention include at least o-chlorobenzenesulfonamide,
m-chlorobenzenesulfonamide,
3,5-dichlorobenzenesulfonamide,
3,5-dibromobenzenesulfonamide,
3-iodobenzenesulfonamide,
3,5-diiodobenzenesulfonamide,
3-nitrobenzenesulfonamide,
3,5-dinitrobenzenesulfonamide,
o-toluenesulfonamide,
2,4-dimethylbenzenesulfonamide,
o-hydroxybenzenesulfonamide,
o-methoxybenzenesulfonamide,
m-hydroxybenzenesulfonamide,
m-isothocyanobenzenesulfonamide,
N-methylbenzenesulfonamide,
N-ethylbenzenesulfonamide,
N-$\beta$-bromoethylbenzenesulfonamide,
N-isopropylbenzenesulfonamide,
N-(1-chloropropyl)benzenesulfonamide,
N-acetyl-o-toluenesulfonamide,
N-cyclohexylbenzenesulfonamide,
N-(4-hydroxy-3-nitrophenyl)benzenesulfonamide,
N-(4-acetyl-phenyl)benzenesulfonamide, and other compounds conforming to the foregoing subgeneric definitions, as found in "The Sulfonamides and Allied Compounds" by Northey, No. 106 in the American Chemical Society monograph series (Reinhold, 1948), pages 52–249.

Example 3

Complex of polymeric 5-methyl-3-vinyl oxazolidin-2-one and sulfaguanidine.—Sulfaguanidine in the form of a white crystalline powder is dispersed with continuous stirring into a warm 25 weight percent aqueous complectant solution of polymeric 5-methyl-3-vinyl oxazolidin-2-one in procedures essentially similar to those set forth hereinbefore. The employed amount of complectant is twice that equimolecular with the employed compectate, considering the complectant upon the carbamate moiety basis. During the course of the stirring the complectate disappears in the aqueous dispersion. Upon completion of the addition of complectate, the resulting preparation is dried and ground to obtain a finely subdivided complex of polymeric-5-methyl-3-vinyl oxazolidin-2-one and sulfaguanidine which is established by infrared spectrum analysis to possess a structure distinctively different from that of either starting material, wherein sulfaguanidine moieties are bonded with the complectant of the instant invention. The said complex is readily dispersible as an apparent solution in water.

Closely related to the sulfonamides and sulfonanilides are the organic derivatives of sulfamic acid, and in particular the N-organic-substituted derivatives. The close structural relationship between such compounds and the sulfonamides is at once apparent. The numerous compounds derived from sulfamic acid by introduction of an organic substituent upon the sulfamic nitrogen, wherein the necessary hydrogen or proton remains, form complexes according to the present invention.

Example 4

Complex of polymeric 5-methyl-3-vinyl-oxazolidin-2-one and sulfonated dodecylmonochlorodiphenyloxide.—In the present example the complectate was a highly refined commercial product prepared by the alkylation of monochlorodiphenyloxide with tetrapropylene (a dodecene) and the subsequent sulfonation of the alkylated product. The product resulting from the preparative processes was a mixture of various isomeric compounds, predominantly a sulfonate of 4-chloro-4'-dodecyldiphenyloxide. The dodecyl groups were predominantly n-dodecyl groups. The complectate may be further characterized in the fact that a 0.1 percent aqueous solution was found to have a surface tension of 31.6 and an interfacial tension against mineral oil of 3.4, both expressed as dynes per centimeter. A saturated aqueous solution contained 2 percent of the said sulfonate, which was soluble in concentrations greater than 5 percent by weight in commercial lubricating oil, kerosene, chloroethylene, methylene chloride, xylene, 1,1,1-trichloroethane, trichloroethylene, toluene, benzene and ethanol. The said sulfonated dodecyl monochloro diphenyloxide product will, for convenience, hereinafter be identified in this example simply as "the sulfonate."

In preparing the instant sulfonate complex, one kilogram of a 20 percent aqueous sulfonate slurry was prepared, comprising 800 grams water and 200 grams of the sulfonate. To this slurry was added, slowly, and with continuous stirring, 1 kilogram 20 percent aqueous solution polymeric 5-methyl-3-vinyloxazolidin-2-one, comprising 800 grams water and 200 grams of the said polymeric complectant. Stirring at room temperature was thereafter continued for approximately 10 minutes. At the time the complectant substances were combined, the resulting mixture was milky-opaque. After approximately 10 minutes of stirring, the mixture had become completely clear, and comprised 2 kilograms of a 20 percent aqueous solution of a complex of the sulfonate and the said polymeric complectant. The solution was thereafter drum dried to vaporize and remove water and obtain the complex as a yellowish, solid, dry material.

This complex was found to be cleanly water soluble in concentrations at least as high as 50 percent of complex by weight of resulting aqueous solution, corresponding to 25 weight percent of complected sulfonate compound.

The uncomplected sulfonate material is known to have germicidal actions; the availability of this action has hitherto been limited by the solubility of the sulfonate material, which is usually lower than 0.5 percent by weight of water.

An aqueous solution of the present complex is a clear, nearly colorless, strongly germicidal material. The complex is adapted to be included in soaps, detergents, and the like at a rate which is the equivalent of 0.1–0.5 weight percent of the sulfonate in the form of its complex, by weight of soap or detergent.

I claim:

1. Complex which is the product of intimately mixing together a compound of the formula

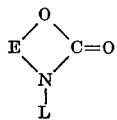

wherein O is the symbol for oxygen, C is the symbol for carbon, N is the symbol for nitrogen, and wherein E represents a divalent moiety selected from ethylene, trimethylene, methylethylene, 1,2-dimethylethylene, 1,3-amylene, 2,3-amylene, 2,4-amylene, 1,2-hexylene, 2,4-hexylene, 2,3-hexylene, 3,4-hexylene; cyclohexyl ethylene, phenylethylene, 1-phenyl-1,3-propylene, 1-phenyl-1,2-propylene, (p-tolyl)ethylene, 2-(o-tolyl)-1,3-trimethylene, L is a group

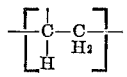

or

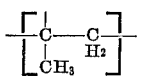

or

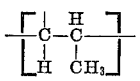

and the resulting compound are polymers upon an average of about each second carbon of which recurs a group

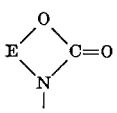

and the resulting polymers have a K-number according to Fikentscher of from about 2 to about 200, with a compound that is a member of the group consisting of methyl hydrogen sulfate,
ethyl hydrogen sulfate,
S-monoethyl thiosulfate,
propyl hydrogen sulfate,
S-monopropyl thiosulfate,
isopropyl hydrogen sulfate,
1-ethylisopropyl hydrogen sulfate,
S-monoisopropyl hydrogen thiosulfate,
mono-n-butyl sulfate,
mono-sec-butyl sulfate,
monoisobutyl sulfate,
mono-n-amyl sulfate,
mono-iso-amyl sulfate,
S-monoisoamyl thiosulfate,
mono-2-ethylbutyl sulfate,
mono-n-octyl sulfate,
monoethyl sulfate,
monoceryl sulfate,
monoallyl sulfate,
S-monoallyl thiosulfate,
mono (1-allyl)-isobutyl sulfate,
mono (1-allyl)-isoamyl sulfate,
phenyl sulfate,
p-acetylphenyl sulfate,
p-nitrophenyl sulfate,
3-methyl-phenyl sulfate,
2-amino-3-carboxyphenyl sulfate,
2-amino-5-carboxyphenyl sulfate,
2-amino-4-methylphenyl sulfate,
2-amino-4-chlorophenyl sulfate,
6-amino-3-methylphenyl sulfate,
2-amino-1-naphthylphenyl sulfate,
2'-methyl-4-dimethylamino-trans-stilbene-3-sulfate,
4-dimethyl-aminoazobenzene-3-sulfate,
dodecyl hydrogen sulfate,
hexadecyl hydrogen sulfate,
octadecyl hydrogen sulfate,
methylsulfonylacetic acid,
methanesulfonic acid,
ethanesulfonic acid,
benzenesulfonic acid,
toluenesulfonic acid,
benzenedisulfonic acid,
1,2-xylene-4-sulfonic acid,
1,3-xylene-4-sulfonic acid,
1,3-xylene-2-sulfonic acid,
1,4-xylene-2-sulfonic acid,
1,3-xylene-2-sulfonic acid,
1,2,4-pseudocumene-5-sulfonic acid,
mesitylene sulfonic acid,
cymene sulfonic acid,
1,3,5-benzene trisulfonic acid,
toluenedisulfonic acid,
mesitylene disulfonic acid,
o-chlorobenzene sulfonic acid,
m-chlorobenzene sulfonic acid,
p-chlorobenzene sulfonic acid,
o-bromobenzene sulfonic acid,
m-bromobenzene sulfonic acid,
p-bromobenzene sulfonic acid,
m-iodobenzene sulfonic acid,
p-iodobenzene sulfonic acid,
o-nitrobenzene sulfonic acid,
m-nitrobenzene sulfonic acid,
p-nitrobenzene sulfonic acid,
m-nitrosobenzene sulfonic acid,
p-sulfanilic acid,
1-aniline-2,4-disulfonic acid,
4'-phenylamino azobenzene-4-sulfonic acid,
benzene thiosulfonic acid,
benzene sulfonamide,
benzene sulfonanilide,
o-chlorobenzene-sulfonamide,
m-chlorobenzenesulfonamide,
3,5-dichlorobenzenesulfonamide,
3,5-dibromobenzenesulfonamide,
3-iodobenzenesulfonamide,
3,5-diiodobenzenesulfonamide,
3-nitrobenzenesulfonamide,
3,5-dinitrobenzenesulfonamide,
o-toluenesulfonamide,
2,4-dimethylbenzenesulfonamide,
o-hydroxybenzenesulfonamide,
o-methoxybenzenesulfonamide,
m-hydroxybenzenesulfonamide,
m-isothicyanobenzenesulfonamide,
N-methylbenzenesulfonamide,
N-ethylbenzenesulfonamide,
N-$\beta$-bromoethylbenzenesulfonamide,
N-isopropylbenzenesulfonamide,
N-(1-chloropropyl)benzenesulfonamide, N-acetyl-o-toluenesulfonamide,
N-cyclohexylbenzenesulfonamide,
N-(4-hydroxy-3-nitrophenyl)benzenesulfonamide,
N-(4-acetyl-phenyl)benzenesulfonamide, and
sulfaguanidine, and the ions of the same formed in aqueous dispersion.

References Cited
UNITED STATES PATENTS

| | | | | |
|---|---|---|---|---|
| 2,873,192 | 2/1959 | Walles et al. | 99—28 |
| 3,449,339 | 6/1969 | Walles | 260—244 |

OTHER REFERENCES

Higuchi et al.: J. Am. Pharm. Soc., Sci. Ed. 43, 393–401 (1954).

Drechsel: J. Org. Chem. 22, 849–51 (1957).

MELVIN GOLDSTEIN, Primary Examiner

U.S. Cl. X.R.

260—66, 77.5, 88.3